(12) United States Patent
Hwang et al.

(10) Patent No.: US 9,583,800 B2
(45) Date of Patent: Feb. 28, 2017

(54) VEHICLE AND METHOD FOR CONTROLLING SAME

(75) Inventors: Jae Cheol Hwang, Seoul (KR); Seung Hun Yeom, Incheon (KR); Jeung Ju Ha, Incheon (KR); Hyun Woo Yoon, Gyunggi-do (KR); Tae Jin Kim, Incheon (KR)

(73) Assignee: LG ELECTRONICS INC., Seoul (KR)

( * ) Notice: Subject to any disclaimer, the term of this patent is extended or adjusted under 35 U.S.C. 154(b) by 1102 days.

(21) Appl. No.: 13/583,291

(22) PCT Filed: Mar. 3, 2011
(Under 37 CFR 1.47)

(86) PCT No.: PCT/KR2011/001458
§ 371 (c)(1),
(2), (4) Date: Apr. 1, 2013

(87) PCT Pub. No.: WO2011/111949
PCT Pub. Date: Sep. 15, 2011

(65) Prior Publication Data
US 2013/0298586 A1    Nov. 14, 2013

(30) Foreign Application Priority Data

Mar. 8, 2010    (KR) .......................... 10-2010-0020458
Mar. 8, 2010    (KR) .......................... 10-2010-0020459
(Continued)

(51) Int. Cl.
*B60K 11/06*    (2006.01)
*H01M 10/663*    (2014.01)
(Continued)

(52) U.S. Cl.
CPC ............ *H01M 10/5095* (2013.01); *B60K 1/04* (2013.01); *B60L 1/003* (2013.01); *B60L 3/0046* (2013.01);
(Continued)

(58) Field of Classification Search
CPC .. B60K 11/06; B60K 1/04; B60K 2001/0438; B60K 2001/0433;
(Continued)

(56) References Cited

U.S. PATENT DOCUMENTS

2006/0080986 A1*  4/2006  Inoue .................. B60H 1/00057
                                                       62/259.2
2009/0023056 A1*  1/2009  Adams ................. B60L 11/1872
                                                         429/120
2011/0153140 A1*  6/2011  Datta ....................... B60R 16/02
                                                          701/31.4

FOREIGN PATENT DOCUMENTS

JP    11-040212 A    2/1999
JP    11-329517 A    11/1999
(Continued)

*Primary Examiner* — Cassey D Bauer
(74) *Attorney, Agent, or Firm* — Dentons US LLP

(57) ABSTRACT

The invention relates to a vehicle, having a cooling air duct disposed within a battery to move cooling air for cooling the battery, so as to enable same to be compact and improve space utilization, in order to optimize cooling performance within a limited space. The vehicle of the present invention also includes a battery-cooling unit that exchanges heat and cools air ventilated from the passenger compartment and then supplies the air to the battery, so as to use the air from the passenger compartment with minimal effects on the air temperature in the passenger compartment, and more efficiently cool the battery. Further, the vehicle and method for controlling same according to the present invention can detect the temperatures of the battery and of the passenger compartment, and determine whether to cool the air in the (Continued)

passenger compartment using a heat exchanger in accordance with each detected temperature, or control the rotation speed of a ventilation fan, in order to more efficiently cool the battery. Accordingly, overheating of the battery can be prevented, and the service life of the battery can be extended. Additionally, the vehicle and method for controlling same according to the present invention involve a dehumidifying unit for supplying cool air inside the battery and dehumidifying the inside of the battery, so as to control the moisture inside the battery and thereby reduce the possibility of electrical hazards and malfunctions occurring due to condensation.

2 Claims, 12 Drawing Sheets

(30) Foreign Application Priority Data

Mar. 8, 2010 (KR) .................. 10-2010-0020460
Mar. 8, 2010 (KR) .................. 10-2010-0020461

(51) Int. Cl.
*B60K 1/04* (2006.01)
*B60L 3/00* (2006.01)
*B60L 11/18* (2006.01)
*B60L 1/00* (2006.01)
*B60K 1/00* (2006.01)

(52) U.S. Cl.
CPC ........... *B60L 11/18* (2013.01); *B60L 11/1864* (2013.01); *B60L 11/1874* (2013.01); *B60L 11/1877* (2013.01); *B60L 11/1879* (2013.01); *H01M 10/663* (2015.04); *B60K 11/06* (2013.01); *B60K 2001/005* (2013.01); *B60K 2001/0433* (2013.01); *B60K 2001/0438* (2013.01); *B60L 2240/34* (2013.01); *B60L 2240/36* (2013.01); *B60L 2240/545* (2013.01); *B60L 2270/145* (2013.01); *Y02T 10/7005* (2013.01); *Y02T 10/7061* (2013.01)

(58) Field of Classification Search
CPC ........... B60K 2001/005; B60L 11/1874; B60L 1/003; B60L 11/1864; B60L 3/0046; B60L 11/1879; B60L 11/1877; B60L 11/06; B60L 2240/545; B60L 2240/36; B60L 2270/145; B60L 2240/34; H01M 10/633

See application file for complete search history.

(56) References Cited

FOREIGN PATENT DOCUMENTS

| | | |
|---|---|---|
| JP | 2006-120334 A | 5/2006 |
| JP | 2007-137127 A | 6/2007 |
| JP | 2008-098060 A | 4/2008 |
| JP | 2008-152956 A | 7/2008 |
| KR | 10-2008-0053717 A | 6/2008 |

* cited by examiner

VEHICLE AND METHOD FOR CONTROLLING SAME

TECHNICAL FIELD

The present invention relates to a vehicle and a control method thereof, and more particularly to a vehicle in which a battery is effectively cooled to improve performance of the battery and to increase lifespan of the battery and a control method thereof.

BACKGROUND ART

A vehicle is a means of transportation which produces power from an engine and transmits the produced power to wheels to transport a passenger or freight on a road.

The vehicle may be mainly divided into a vehicle body forming the external appearance of the vehicle and a chassis to which various devices are connected. The chassis includes principal devices, such as a vehicle engine which is motive power for travelling, a power transmission device, a steering device, a suspension device, and a brake device.

Most vehicle engines are four-stroke internal combustion engines. A four-stroke internal combustion engine is an internal combustion engine in which four strokes, such as an intake stroke, a compression stroke, a power stroke, and an exhaust stroke, constitute one cycle. Such a four-stroke internal combustion engine is the most common example of a reciprocating engine. An internal combustion engine, which mainly uses a volatile fuel, may directly obtain kinetic energy from thermal energy generated by compressing and burning the fuel in a state in which the fuel is fully mixed with oxygen in the air so that the fuel can be completely combusted.

The internal combustion engine, which uses such a volatile fuel, causes environmental pollution due to exhaust gas and also contributes to depletion of petroleum resources. An electric vehicle (EV), which is driven by electric current as power, has come to the front as an alternative to the internal combustion engine which uses the volatile fuel. The electric vehicle is a nonpolluting vehicle having no exhaust gas and noise. However, the electric vehicle has not been put to practical use due to high production cost, low maximum velocity, a short range, and overheating of a battery.

High oil price and recently strengthened restrictions on exhaust gas have increased speed in development of electric vehicles, and the market scale thereof is rapidly growing.

DISCLOSURE

Technical Problem

It is an object of the present invention to provide a vehicle in which a battery is effectively cooled and a control method thereof.

It is another object of the present invention to provide a vehicle in which humidity in a battery is controlled and a control method thereof.

Technical Solution

A vehicle according to the present invention includes a battery including a plurality of cell modules, the battery being used as an energy source, a battery cooling unit to supply cool air necessary to cool the battery, and a cool air duct to guide the air supplied from the battery cooling unit to the cell modules.

Also, a vehicle according to another aspect of the present invention includes a battery used as an energy source, an air conditioner to condition air in an interior of the vehicle using a refrigerant, and a battery cooling unit to perform heat exchange between some of the refrigerant circulated in the air conditioner and the air blown from the interior of the vehicle and to introduce the heat-exchanged air into the battery so that the battery is cooled.

Also, a vehicle according to another aspect of the present invention includes a battery used as an energy source, an air conditioner to condition air in an interior of the vehicle using a refrigerant, a battery temperature sensor to sense temperature of the battery, a vehicle interior temperature sensor to sense temperature of the interior of the vehicle, a battery cooling unit to blow the air in the interior of the vehicle to the battery or to perform heat exchange between the air in the interior of the vehicle and the refrigerant circulated in the air conditioner and to blow the heat-exchanged air to the battery so that the battery is cooled according to the temperature of the interior of the vehicle, and a controller to control an operation of the battery cooling unit according to the temperature of the battery and to control an operation of the air conditioner according to the temperature of the interior of the vehicle upon cooling the battery, thereby controlling temperature of the air supplied to the battery.

Also, a control method of a vehicle according to the present invention includes a battery temperature sensing step of sensing temperature of a battery, a vehicle interior temperature sensing step of sensing temperature of an interior of the vehicle, a battery temperature comparison step of comparing the sensed battery temperature with a set battery temperature, a vehicle interior temperature comparison step of comparing the sensed vehicle interior temperature with a set vehicle interior temperature if the sensed battery temperature is higher than the set battery temperature, and a battery cooling step of driving the air conditioner to cool the air blown from the interior of the vehicle and to supply the cooled air to the battery so that the battery is cooled if the sensed vehicle interior temperature is higher than the set vehicle interior temperature.

Also, a vehicle according to yet another aspect of the present invention includes a battery used as an energy source, a dehumidification unit to supply cool air into the battery to dehumidify an interior of the battery, and a controller to control an operation of the dehumidification unit according to humidity in the battery.

Also, a control method of a vehicle according to another aspect of the present invention includes a sensing step of sensing temperature and relative humidity in a battery, a calculation step of calculating a dew point temperature from values sensed at the sensing step and calculating a difference between present temperature in the battery and the dew point temperature, and a dehumidification step of dehumidifying an interior of the battery if the difference calculated at the calculation step is within a set range.

Advantageous Effects

In a vehicle according to the present invention, a cool air duct to convey cool air necessary to cool a battery is disposed in the battery, and therefore, the battery can be configured to have a compact structure. Consequently, the present invention has an advantage of improving space utilization and achieving optimal cooling performance in a limited space.

Also, the battery is configured so that the air used to cool the battery is discharged from the battery due to a pressure difference between the inside and the outside of the battery, and therefore, an additional suction device is not necessary. Consequently, the present invention has an advantage of simplifying the structure of the battery.

Also, discharge ports to discharge cool air into the battery are set to have different sizes and positions so that the amount of discharged cool air is changed based on position. Consequently, the present invention has an advantage of improving cool air circulation and cooling performance.

Also, a heat exchanger is installed separately from an air conditioner to cool the interior of the vehicle. Consequently, the present invention has an advantage of improving cooling performance.

A vehicle according to another aspect of the present invention includes a battery cooling unit to cool air blown from the interior of the vehicle by heat exchange and to supply the cooled air to the battery. Consequently, an influence caused by the temperature of air in the interior of the vehicle is minimized even though the air in the interior of the vehicle is used, and therefore, the present invention has an effect of more efficiently cooling the battery. As a result, it is possible to increase the lifespan of the battery.

Also, a battery heat exchanger is installed separately from the air conditioner. Consequently, the present invention has an advantage in that the battery heat exchanger can be controlled independently of cooling and heating of the interior of the vehicle.

Also, a vehicle and a control method thereof according to another aspect of the present invention are configured to sense the temperature of a battery and the temperature of the interior of the vehicle, and therefore, it is possible to determine whether air in the interior of the vehicle to be supplied to the battery is to be cooled or adjust the rotational velocity of a ventilation fan considering temperature of the interior of the vehicle as well as the temperature of the battery, thereby more efficiently cooling the battery. Consequently, it is possible to prevent overheating of the battery and to increase the lifespan of the battery.

Also, a vehicle and a control method thereof according to another aspect of the present invention include a dehumidification unit to supply cool air in a battery to dehumidify the interior of the battery, thereby controlling humidity in the battery. Consequently, the present invention has an effect of preventing an electrical hazard and breakdown due to a dew condensation phenomenon.

Also, the dehumidification is carried out using the air conditioner to condition air in the interior of the battery. Consequently, the present invention has an advantage of achieving a dehumidification effect without an additional device.

Also, a dew point temperature is calculated using temperature and relative humidity in the battery, and the interior of the battery is dehumidified based on the difference between the dew point temperature and the present temperature. Consequently, the present invention has an advantage of easily and conveniently performing a control operation.

BEST MODE

Hereinafter, an electric vehicle (EV) (hereinafter, referred to as a 'vehicle'), which is driven by electric current as power, as an embodiment of a vehicle according to the embodiment will be described in detail with reference to the accompanying drawings, and then a battery pack (hereinafter, referred to as a 'battery'), which is used as an energy source for the electric vehicle, will be described in detail with reference to the accompanying drawings.

Figure 1:
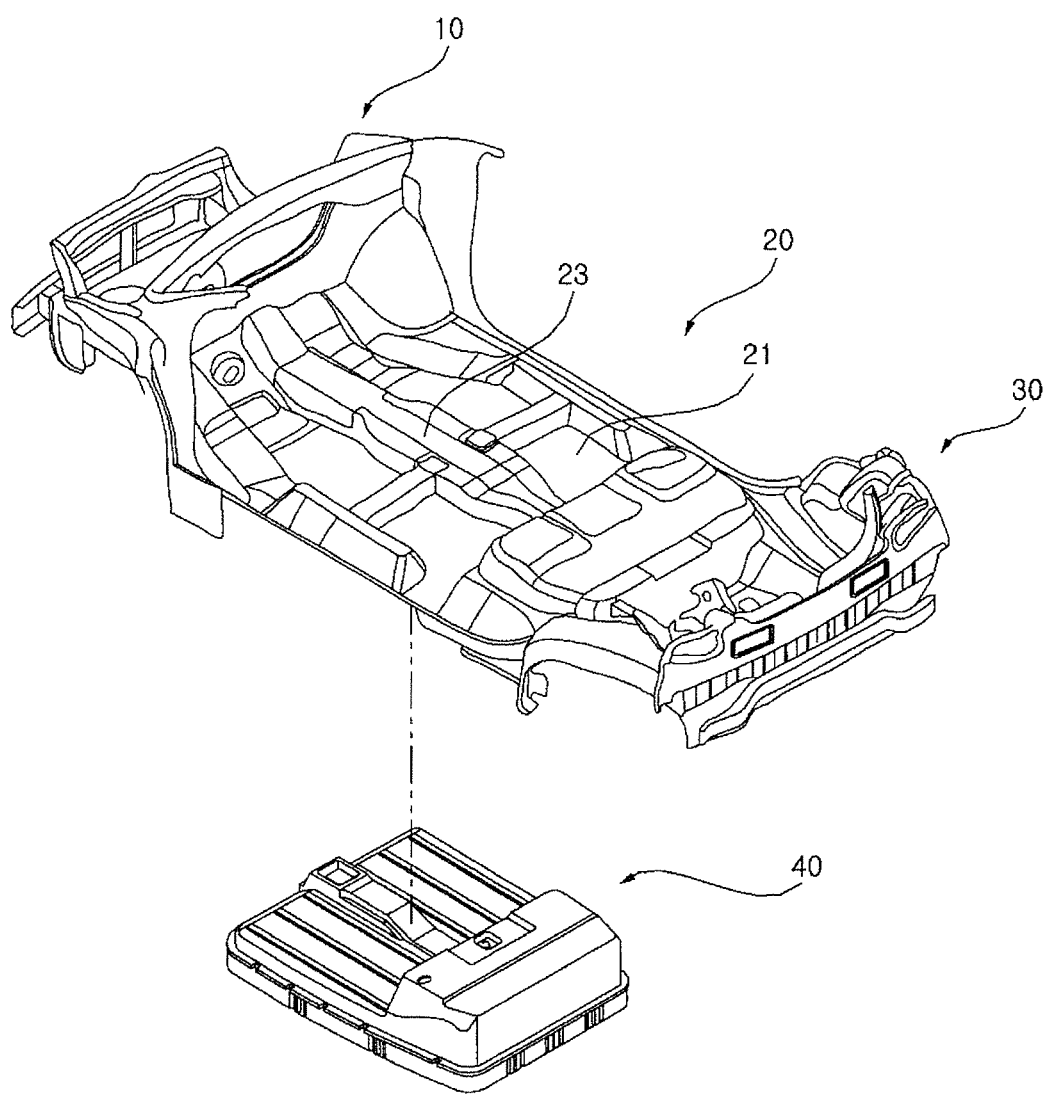
FIG. 1 is a perspective view showing a vehicle body of a vehicle according to a first embodiment of the present invention with a battery.

FIG. 1 is a perspective view showing a vehicle body of a vehicle according to a first embodiment of the present invention with a battery.

Referring to FIG. 1, the vehicle body of the vehicle according to the first embodiment of the present invention includes a front vehicle body 10 in which a motor and power transmission parts are mounted, a middle vehicle body 20 in which a passenger takes a seat, and a rear vehicle body 30 in which a spare tire and other articles are kept.

The vehicle bodies 10 to 30 define a closed space, in which various devices are arranged, and a passenger or freight is accommodated. It is necessary for the vehicle body to have a structure in which a portion of the vehicle body is opened or closed to allow entrance and exit of a passenger or freight and to easily achieve maintenance of various devices. It is an important function of the vehicle body to protect a passenger or freight and various devices from rain, wind, dust, etc. Also, the shapes of the vehicle bodies 10 to 30 form the external appearance of the vehicle.

The front vehicle body 10 is formed in the shape of "#," and a motor and a transmission are provided in the front vehicle body 10. The front vehicle body 10 is provided with a steering device to adjust the direction of an axis of rotation of each front wheel so as to change the advancing direction of the vehicle and a front wheel suspension device to prevent vibration generated from a road surface from being directly transmitted to the vehicle body.

The motor, the transmission, and various auxiliary instruments are mounted in the front vehicle body 10. In addition, it is necessary for the front vehicle body 10 to support the front wheels of the front wheel suspension device. Also, the front vehicle body 10 takes charge of drive force for a vehicle with front-wheel drive.

The front vehicle body 10 crumples, when strong impact is applied to the front vehicle body 10 due to an accident, so as to absorb such impact so that strong force is not transmitted to the interior of the vehicle. Respective parts of the front vehicle body 10 are fixed to the front vehicle body 10 by bolts or nuts or are welded to the front vehicle body 10. Only outer panels, such as a front fender and a hood, are separated from the front vehicle body 10.

The middle vehicle body 20 defines a major portion of the interior of the vehicle, i.e. a passenger compartment. For this reason, the inner space of the middle vehicle body 20 is configured to have as large a size as possible. The middle vehicle body 20 includes a floor 21 forming the bottom of the vehicle, the floor 21 being configured so that a battery 40 is mounted at the lower side of the floor 21, a middle tunnel 23 formed at the middle of the floor, and side tunnels 24 provided at right and left edges of the floor 21.

The floor 21 is the bottom of the interior of the vehicle. The front floor 21 is formed of a panel having high strength and large area.

The middle tunnel 23 is formed in a state in which the middle tunnel 23 protrudes upward and extends in the longitudinal direction of the vehicle. The middle tunnel 23 may be formed integrally with the floor 21. Alternatively, the middle tunnel 23 may be formed separately with the floor 21 and then coupled to the floor 21 by welding.

The side tunnels 24 extend in the longitudinal direction of the vehicle so that each of the side tunnels 24 becomes a base of each filler. The side tunnels 24 may be referred to as side members.

A front filler (not shown) and a center filler (not shown) may be coupled to each of the side tunnels 24.

The side tunnels 24 may be formed integrally with the floor 21. Alternatively, the side tunnels 24 may be formed separately with the floor 21 and then coupled to the floor 21 by welding.

The rear vehicle body 30 may be provided with a rear wheel suspension device (not shown) to prevent vibration generated from a road surface from being directly transmitted to the vehicle body.

Figure 2:
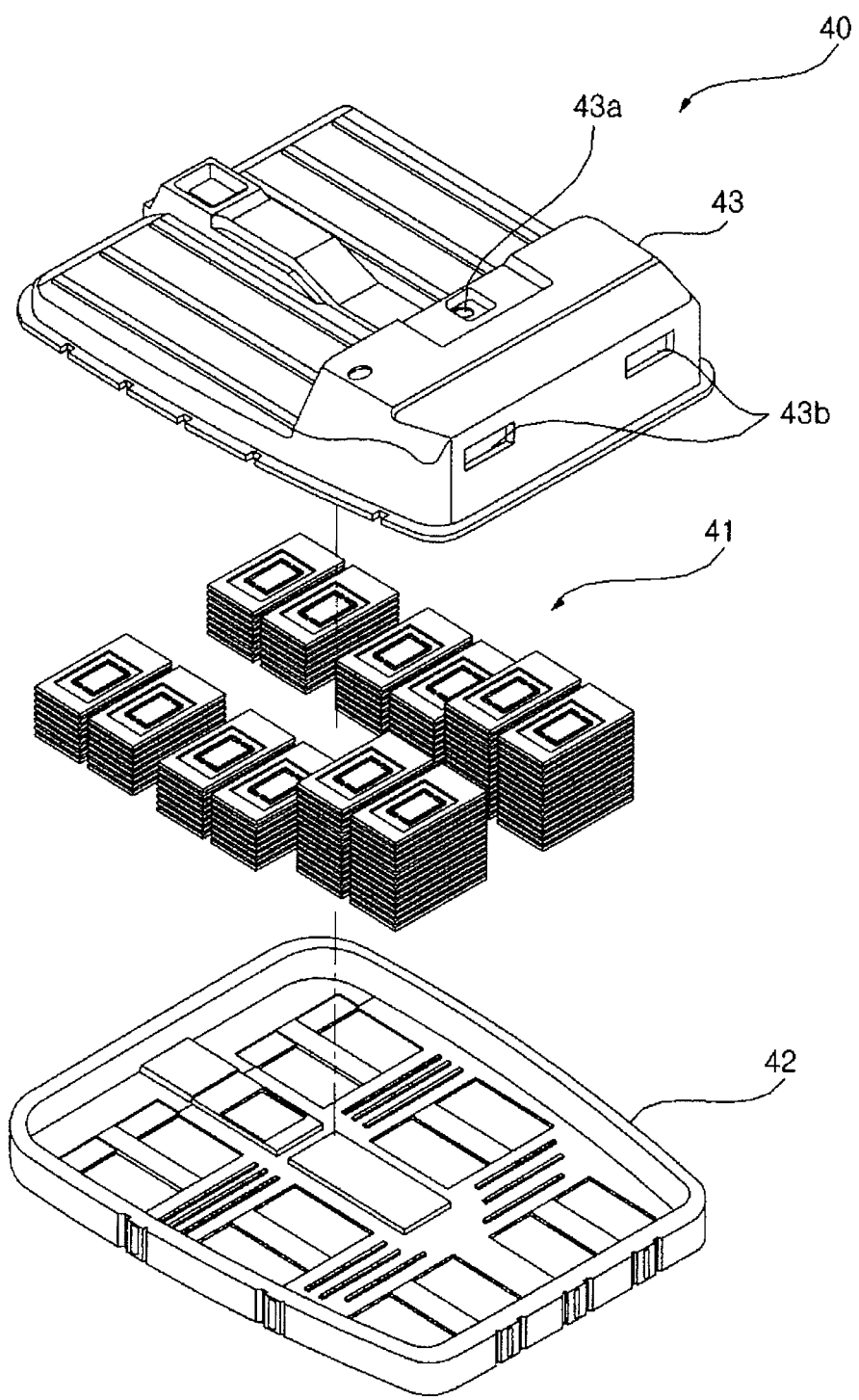
FIG. 2 is an exploded perspective view of the battery shown in FIG. 1.
Figure 3:
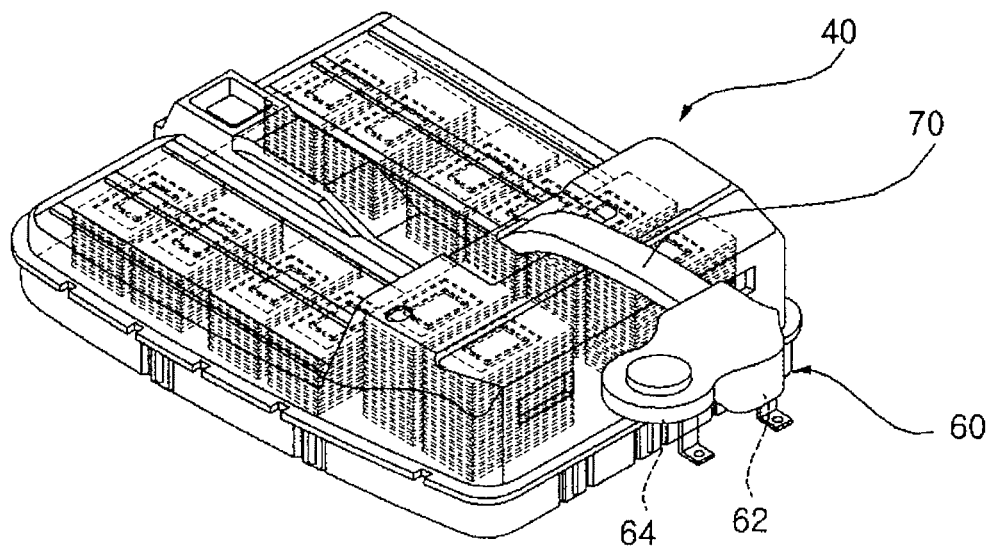
FIG. 3 is a perspective view showing the battery to which a cooling unit according to a first embodiment of the present invention is coupled.
Figure 4:
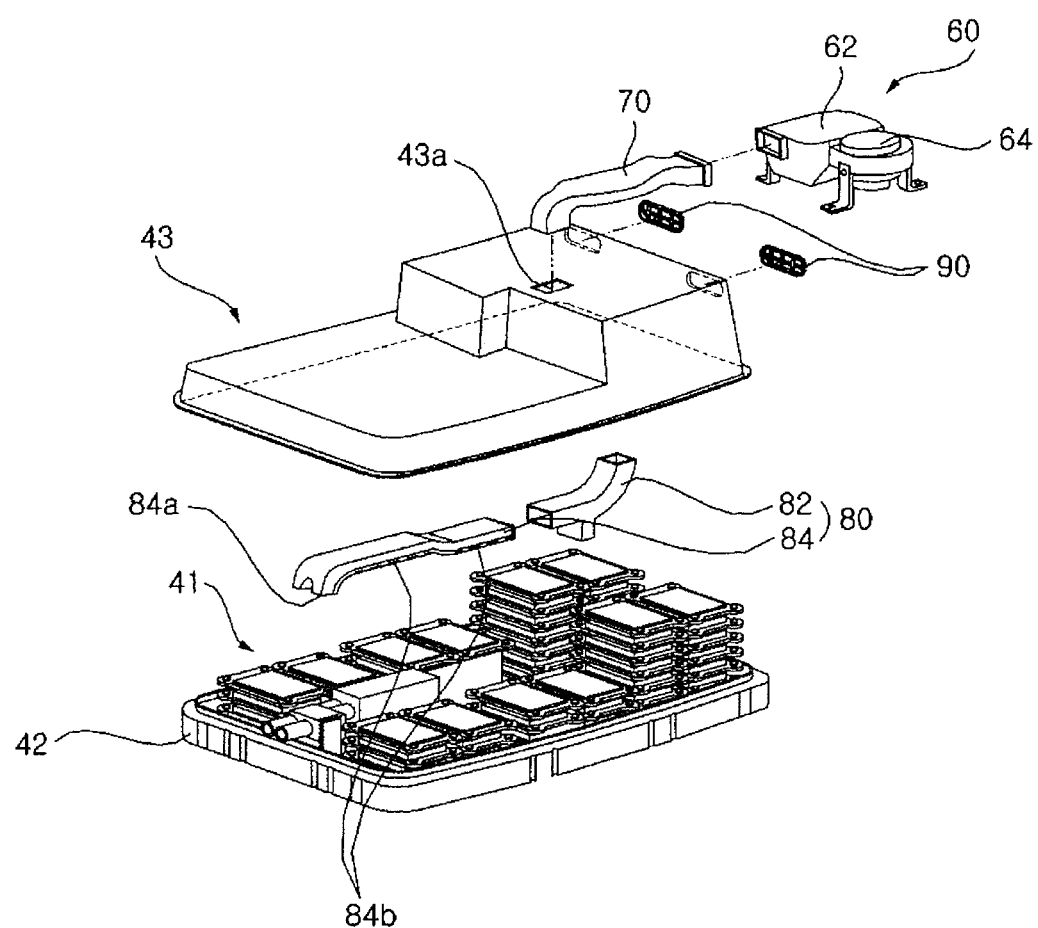
FIG. 4 is an exploded perspective view showing the cooling unit and a cool air duct according to a first embodiment of the present invention.
Figure 5:
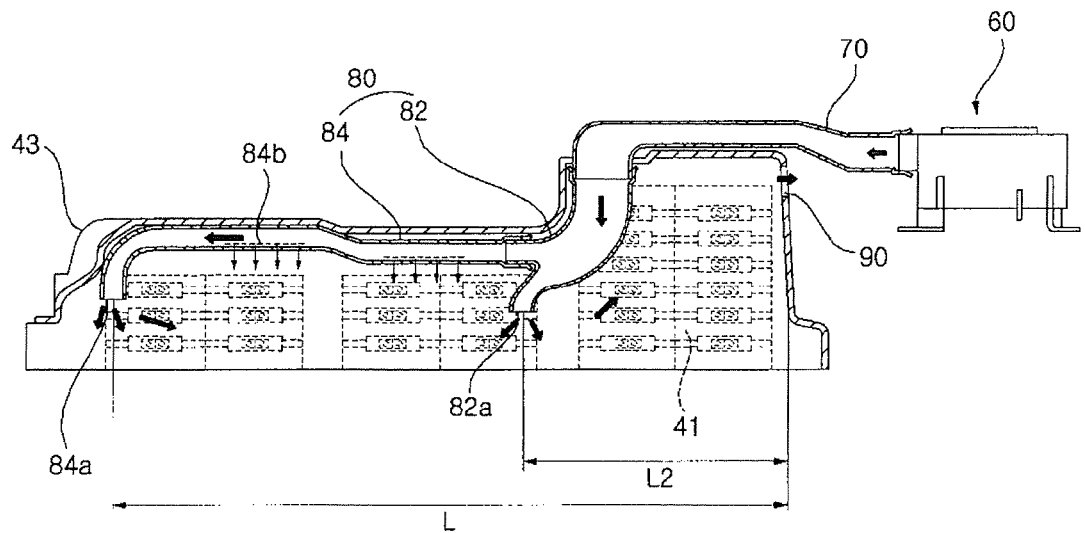
FIG. 5 is a sectional view showing the flow of cool air in the cool air duct according to the first embodiment of the present invention.
Figure 6:
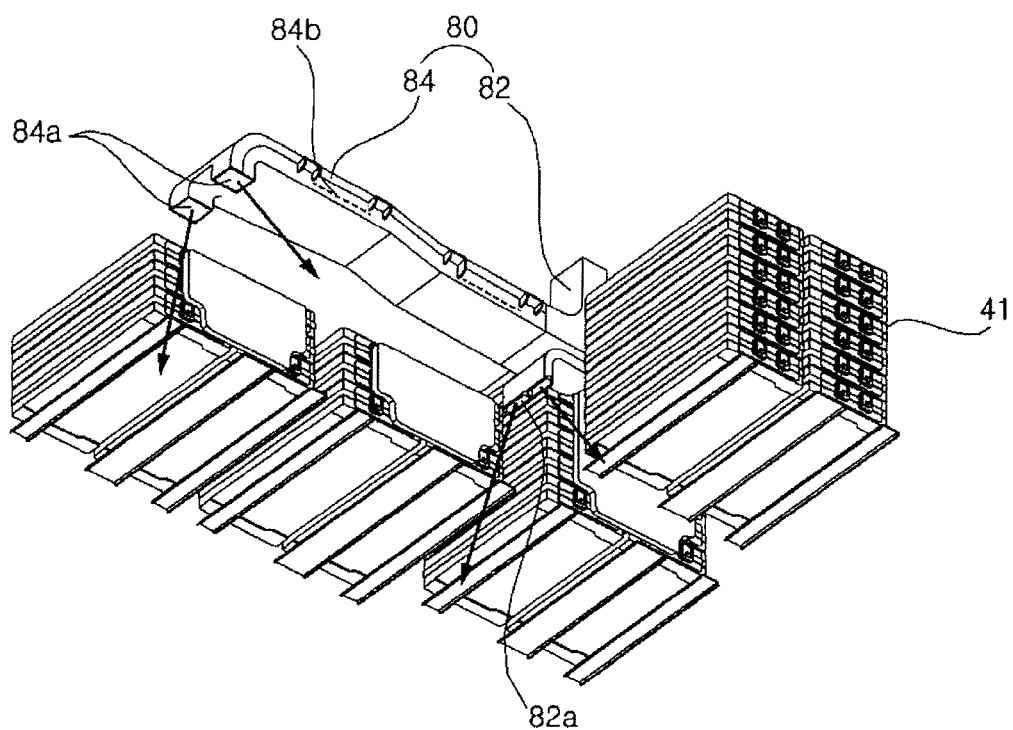
FIG. 6 is a perspective view showing the flow of cool air in the cool air duct according to the first embodiment of the present invention.
Figure 7:
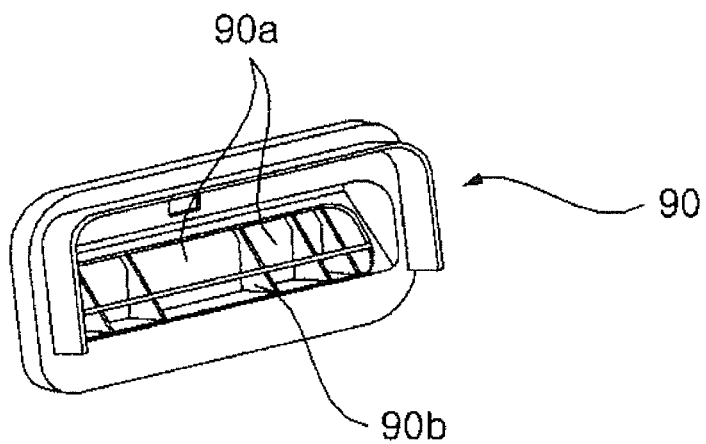
FIG. 7 is a view showing a vent according to a first embodiment of the present invention.

FIG. 2 is an exploded perspective view of the battery shown in FIG. 1, FIG. 3 is a perspective view showing the battery to which a cooling unit according to a first embodiment of the present invention is coupled, FIG. 4 is an exploded perspective view showing the cooling unit and a cool air duct according to a first embodiment of the present invention, FIG. 5 is a sectional view showing the flow of cool air in the cool air duct according to the first embodiment of the present invention, FIG. 6 is a perspective view showing the flow of cool air in the cool air duct according to the first embodiment of the present invention, and FIG. 7 is a view showing a vent according to a first embodiment of the present invention.

Referring to FIG. 2, the battery 40 may include a battery carrier 42 coupled to the floor 21 to support a plurality of cell modules 41 and a battery cover 43 disposed at the upper side of the battery carrier 42 to surround the cell modules 41.

The battery 40 is also referred to as a battery pack or an energy storage module (ESM). In this embodiment, the term 'battery' will be used.

Each of the cell modules 41 is also referred to as a cell module assembly (CMA). Hereinafter, the term 'cell module' will be used.

The cell modules 41 generate current. The cell modules 41 may be stacked in the upward and downward direction. Alternatively, the cell modules 41 may be stacked in the frontward and rearward direction or in the right and left direction.

The battery carrier 42 may be coupled to the floor 21 by fastening members, such as bolts.

The battery cover 43 is formed so as to cover the cell modules 41. A battery cooling unit 60 and a cool air duct 80, which will be described below, may be coupled to the battery cover 43.

Referring to FIGS. 3 and 4, a battery cooling unit 60 to supply cool air necessary to cool the battery 40, an external duct 70 disposed at the outside of the battery 40 to connect the battery 40 to the battery cooling unit 60, and a cool air duct 80 disposed at the inside of the battery 40 to guide air supplied from the battery cooling unit 60 to the cell modules 41 are coupled to the battery 40.

The vehicle further includes an air conditioner (not show) to condition air in the interior of the vehicle using a refrigerant. The air conditioner (not shown) may include a compressor, a condenser, an evaporator, and an expansion valve.

The battery cooling unit 60 includes a heat exchanger 62 to perform heat exchange between the refrigerant bypassed from the air conditioner (not shown) and air introduced into the cool air duct 80 and a ventilation fan 64 to blow air.

The evaporator to evaporate the refrigerant bypassed from the air conditioner (not shown) may be used as the heat exchanger 62. The heat exchanger 62 may be installed separately from the air conditioner (not shown). Alternatively, the evaporator of the air conditioner (not shown) may be used as the heat exchanger 62. In this embodiment, the heat exchanger 62 is installed separately from the evaporator of the air conditioner (not shown).

In a case in which the heat exchanger 62 is installed separately from the evaporator of the air conditioner (not shown) to exchange heat with the refrigerant bypassed from the air conditioner (not shown), the temperature of cool air may be little affected by the temperature in the interior of the vehicle.

The ventilation fan 64 may blow external air or air in the interior of the vehicle to the heat exchanger 62.

The battery cooling unit 60 may be fixedly installed at the battery carrier 42. Alternatively, the battery cooling unit 60 may be fixed to the floor 21 by additional fastening members.

The battery cooling unit 60 may be directly connected to the battery cover 43. Alternatively, the battery cooling unit 60 may be connected to the battery cover 43 via the external duct 70. In this embodiment, the battery cooling unit 60 is connected to the battery cover 43 via the external duct 70.

The battery cover 43 is provided with a duct connection port 43*a*, to which the external duct 70 is connected.

One end of the external duct 70 may be coupled to the battery cooling unit 60, and the other end of the external duct 70 may be inserted into the battery cover 43 via the duct connection port 43*a*.

The battery cooling unit 60 may be disposed at the rear of the battery 40, and the cool air duct 80 may extend in the longitudinal direction of the battery to supply cool air to the front.

The cool air duct 80 may be constituted by a single duct having a plurality of discharge ports, through which cool air is discharged. Alternatively, the cool air duct 80 may include a plurality of ducts which are coupled to each other. In this embodiment, the cool air duct 80 includes two ducts which are coupled to each other so that the ducts communicate with each other.

The cool air duct 80 includes a first cool air duct 82 connected to the external duct 70 at the duct connection port 43*a* and a second cool air duct 84 connected to the first cool air duct 82 while extending in the frontward and rearward direction.

The first cool air duct 82 may be bent in the shape of ']'.

The first cool air duct 82 and the second cool air duct 84 may be disposed at the inside of the battery cover 43 so that the first cool air duct 82 and the second cool air duct 84 do not interfere with the cell modules 41.

The first cool air duct 82 and the second cool air duct 84 may be disposed in the battery cover 43 at the upper side thereof. Also, the first cool air duct 82 and the second cool air duct 84 may be disposed between the cell modules 41 arranged in two rows.

The cool air duct 80 may include a plurality of discharge ports disposed at predetermined intervals in the longitudinal direction of the cool air duct 80 so that cool air can be discharged through the discharge ports at a plurality of positions.

The discharge ports may include a sub discharge port 82*a* formed at the first cool air duct 82 to discharge only some of the cool air supplied from the battery cooling unit 60, and a main discharge port 84*a* formed at the second cool air duct 84 to discharge the remainder of the cool air, excluding the cool air discharged through the first cool air duct 82.

The main discharge port 84*a* may be spaced apart from a vent unit 90, which will be described below. The main discharge port 84*a* may be disposed opposite to the vent unit 90 so that the main discharge port 84*a* is spaced apart from the vent unit 90 by a predetermined distance. That is, the vent unit 90 may be disposed at the rear of the battery cover 43, and the main discharge port 84*a* may be disposed adjacent to the front inside of the battery cover 43.

The sub discharge port 82*a* and the main discharge port 84*a* may each have a plurality of discharge holes. In this embodiment, the sub discharge port 82*a* and the main discharge port 84*a* each have two discharge holes. In a case in which the sub discharge port 82*a* and the main discharge port 84*a* each have two discharge holes, air may be discharged in the right and left direction.

Referring to FIG. 5, a ratio of a discharge amount D_main of cool air discharged through the main discharge port 84*a* to a discharge amount D_sub of cool air discharged through the sub discharge port 82*a* may be set to a ratio of a distance L–L2 between the main discharge port 84*a* and the sub discharge port 82*a* to a distance L2 between the vent unit 90 and the sub discharge port 82*a*.

Also, the ratio of the discharge amount D_main of cool air discharged through the main discharge port 84*a* to the discharge amount D_sub of cool air discharged through the sub discharge port 82*a* may be set considering the internal volume of the battery 40 and the number of the cell modules 41.

Also, the main discharge port 84*a* may be provided with a plurality of slit holes 84*b* through which cool air is sprayed. Each of the slit holes 84*b* may be formed in the shape of a slit, and the slit holes 84*b* may be arranged at predetermined intervals.

The slit holes 84*b* may be formed at the side of the second cool air duct 84 so that cool air can be sprayed in the lateral direction.

The vent unit 90, through which air is discharged from the battery 40, is provided at the battery cover 43.

The vent unit 90 is disposed at the rear of the battery cover 43 so that air is discharged rearward through the vent unit.

A plurality of vent units 90 may be provided. In this embodiment, two vent units are spaced apart from each other by a predetermined distance.

At the battery cover 43 are formed mounting holes 43*b*, in which the vent units 90 are fitted.

Each of the vent units 90 has a plurality of vent holes 90*a*. Each of the vent units 90 may be formed in the shape of a frame, which is mounted in a corresponding one of the mounting holes 43*b*. Each of the vent units 90 may be provided with air guides 90*b* to guide the flow of air discharged through the vent holes 90*a*.

Also, the vehicle may further include a temperature sensor (not shown) to sense the temperature of the battery 40 and a controller (not shown) to control the driving of the battery cooling unit 60 according to the temperature sensed by the temperature sensor (not shown).

Hereinafter, a method of cooling the battery with the above-stated construction according to the first embodiment of the present invention will be described.

The controller (not shown) may control the driving of the battery cooling unit 60 according to the temperature sensed by the temperature sensor (not shown).

When the ventilation fan 64 of the battery cooling unit 60 is driven, external air is forcibly introduced and exchanges heat with a refrigerant passing through the heat exchange 62 in the heat exchanger 60.

Since the heat exchanger 60 serves as an evaporator, heat of the air in the heat exchanger 60 is transferred to the refrigerant with the result that the air may be a low-temperature cool air.

The cool air is introduced into the first cool air duct 82 and the second cool air duct 84 through the external duct 70.

Some of the cool air flowing in the first cool air duct 82 is discharged into the battery 40 through the sub discharge port 82*a* to cool the cell modules 41.

The remainder of the cool air flows along the second cool air duct 84 and then is discharged into the battery 40 through the main discharge port 84*a*. The cool air discharged through the main discharge port 84*a* cools the front part of the battery 40.

Also, some of the cool air flowing along the second cool air duct 84 is discharged in the lateral direction through the slit holes 84*b*. The amount of the cool air discharged through the slit holes 84*b*, which is very little, may adjust the overall atmospheric temperature in the battery 40.

The air, which has been discharged into the battery 40 to cool the cell modules 41, is discharged from the battery through the vent holes 90*a*.

The air, which has cooled the cell modules 41, may be discharged through the vent holes 90*a* due to pressure difference between the inside and outside of the battery 40. That is, an additional suction device to discharge air is not necessary.

Since the second discharge port 84*b* is located at the front of the battery 40, and the vent holes 90*a* are located at the rear of the battery 40, the cool air may sufficiently cool the cell modules 41 and may then be discharged from the battery 40.

Figure 8:
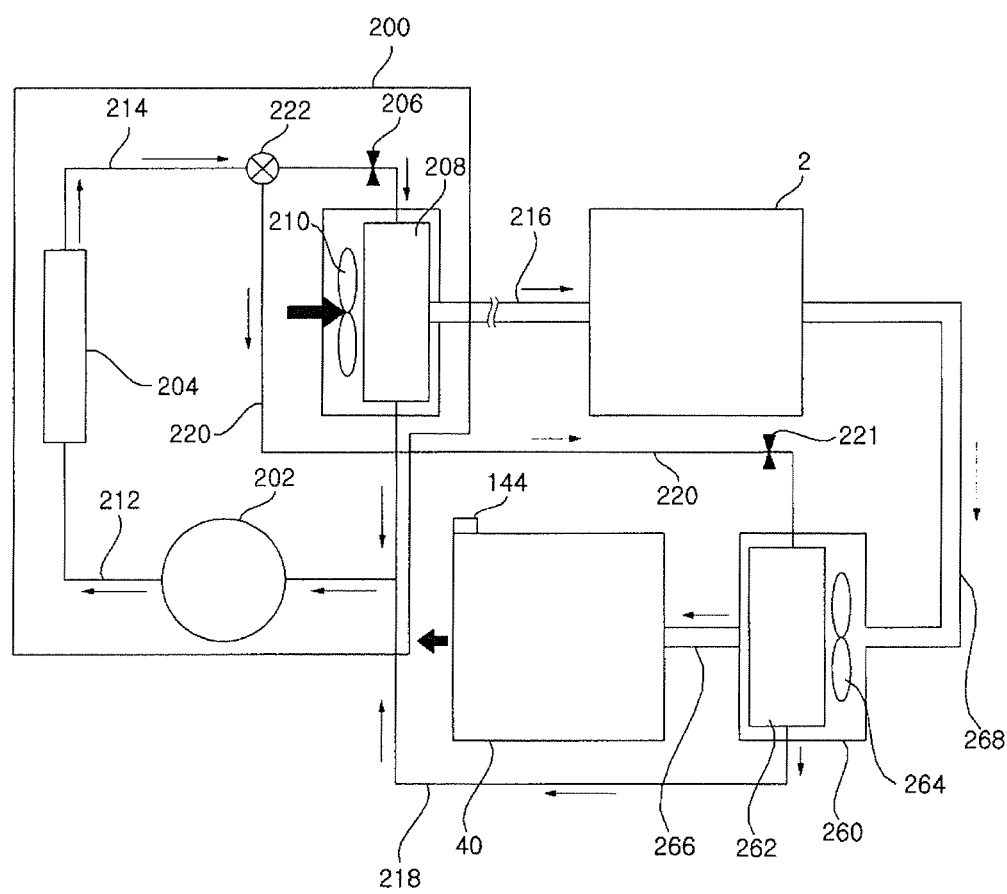
FIG. 8 is a view showing the construction of a battery cooling system of a vehicle according to a second embodiment of the present invention.
Figure 9:
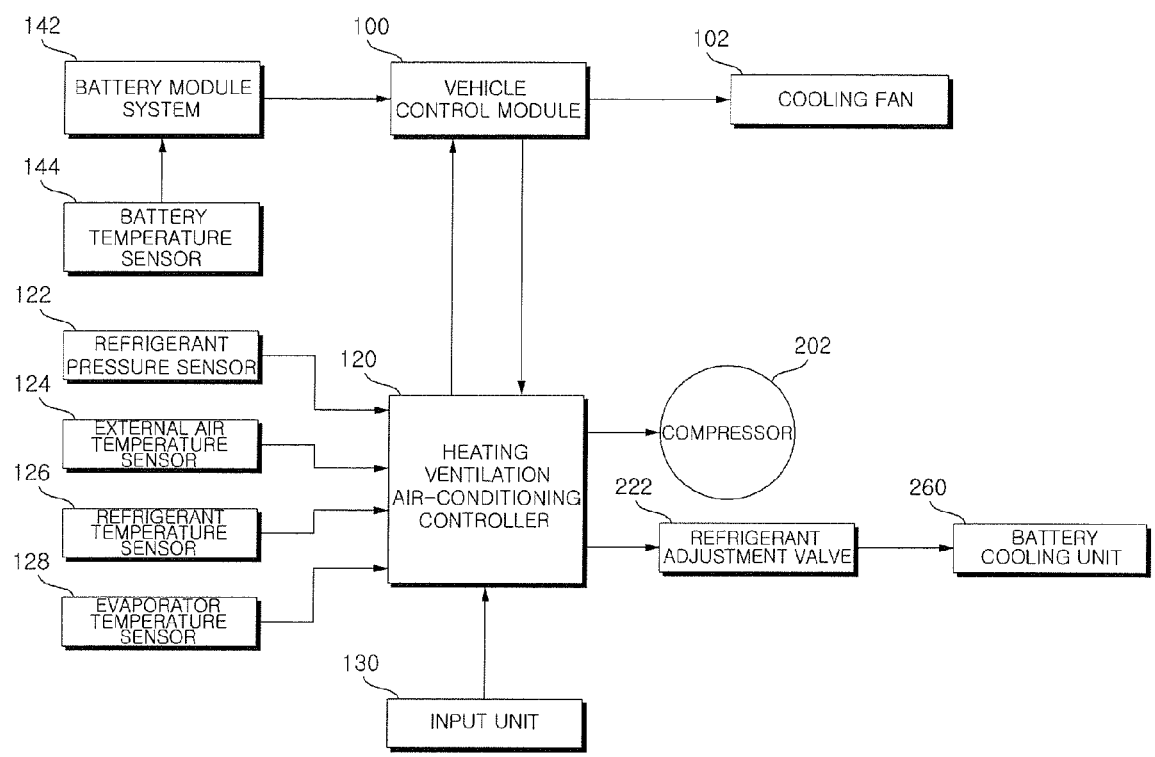
FIG. 9 is a block diagram showing the control flow of the battery cooling system of the vehicle according to the second embodiment of the present invention.

FIG. 8 is a view showing the construction of a battery cooling system of a vehicle according to a second embodiment of the present invention, and FIG. 9 is a block diagram showing the control flow of the battery cooling system of the vehicle according to the second embodiment of the present invention.

Referring to FIG. 8, the vehicle according to the second embodiment of the present invention includes an air conditioner 200 to condition air in the interior of the vehicle using a refrigerant and a battery cooling unit 1260 to perform heat exchange between some of the refrigerant circulated in the air conditioner 200 and air blown from the interior 2 of the vehicle and to introduce the heat-exchanged air into a battery 40 so that the battery 40 is cooled. The battery 40 and other components of the vehicle according to the second embodiment of the present invention are similar in construction and operation to those of the vehicle according to the first embodiment of the present invention. Therefore, the same parts will be denoted by the same reference numerals, and a detailed description thereof will be omitted.

The air conditioner 200 may include a compressor 202 to compress a refrigerant, a condenser 204 to condense the refrigerant discharged from the compressor 202, an expansion valve 206 to expand the refrigerant discharged from the condenser 204, a vehicle interior heat exchanger 208 to evaporate the refrigerant discharged from the expansion valve 206, and a refrigerant circulation passage interconnecting the compressor 202, the condenser 204, the expansion valve 206, and the vehicle interior heat exchanger 208 to circulate the refrigerant.

A vehicle interior ventilation fan 210 to blow external air is installed at the side of the vehicle interior heat exchanger 208.

The vehicle interior heat exchanger 208 and the interior 2 of the vehicle are connected to each other via a first duct 216. Consequently, air cooled by heat exchange performed by the vehicle interior heat exchanger 208 is introduced into the interior 2 of the vehicle via the first duct 216 to cool the interior 2 of the vehicle.

The refrigerant circulation passage may include a first refrigerant circulation passage 212 to guide the refrigerant discharged from the vehicle interior heat exchanger 208 to the condenser 204 via the compressor 202 and a second refrigerant circulation passage 214 to circulate the refrigerant discharged from the condenser 204 to the vehicle interior heat exchanger 208.

The battery cooling unit 260 may include a battery ventilation fan 264 to blow air in the interior 2 of the vehicle and a battery heat exchanger 262 to exchange heat with the air introduced from the interior 2 of the vehicle using heat of the refrigerant circulated in the air conditioner 200.

The battery heat exchanger 262 is connected to the second refrigerant circulation passage 214 via a refrigerant bypass passage 220.

At the connection between the second refrigerant circulation passage 214 and the refrigerant bypass passage 220 is installed a refrigerant adjustment valve 222 to determine whether to bypass the refrigerant and to adjust the bypassed amount of the refrigerant.

The refrigerant bypass passage 220 bypasses some of the refrigerant discharged from the condenser 204 and guides the bypassed refrigerant to the battery heat exchanger 262.

An expansion valve 221 may be installed at the refrigerant bypass passage 220.

The battery heat exchanger 262 may be connected to the first refrigerant circulation passage 212 via a third refrigerant circulation passage 214. The third refrigerant circulation passage 214 guides the refrigerant discharged from the battery heat exchanger 262 to the compressor 202.

The battery heat exchanger 262 may be installed separately from the vehicle interior heat exchanger 208 so that the battery heat exchanger 262 can be controlled independently of cooling and heating of the interior of the vehicle.

The battery heat exchanger 262 and the interior 2 of the vehicle are connected to each other via a second duct 268 so that air in the interior 2 of the vehicle is supplied to the battery heat exchanger 262 through the second duct 268.

In the battery heat exchanger 262, heat exchange between the air introduced through the second duct 268 and the refrigerant introduced through the refrigerant bypass passage 220 is performed.

Since the battery heat exchanger 262 is provided, air in the interior 2 of the vehicle is not directly blown to the battery 40 but is cooled by heat exchange performed by the battery heat exchanger 262 and is then blown to the battery 40. Consequently, the temperature of the cool air may be little affected by the temperature of air in the interior of the vehicle.

The battery cooling unit 260 may be connected to the battery 40 via a third duct 266 so that air cooled by heat exchange performed by the battery heat exchanger 262 is introduced into the battery case through the third duct 266.

In the battery 40 may be installed a battery temperature sensor 144 to sense the temperature of the battery 40. The battery temperature sensor 144 senses the temperature of the battery 40 in real time or at predetermined time intervals and transmits the sensed temperature to a battery module system (BMS) 142.

Referring to FIG. 9, the vehicle according to the present invention further includes a heating ventilation air-conditioning (HVAC) controller 20 to determine and control the state of the air conditioner 200 and a vehicle control module (VCM) 100 connected to the battery temperature sensor 144 and the heating ventilation air-conditioning controller 20 to control the heating ventilation air-conditioning controller 20 according to a signal from the battery temperature sensor 144.

The vehicle control module 100 is configured to control the overall operation of the vehicle. For example, the vehicle control module 100 may control the operation of a brake, a suspension, or a cooling fan 102. The vehicle control module 100 may receive a signal indicating the pressure of the refrigerant sensed by a refrigerant pressure sensor 122 and control rotational velocity of the cooling fan 40 according to the sensed pressure of the refrigerant.

The battery module system 142 manages and controls the overall state of the battery 40. For example, the battery module system 142 may confirm a charged state of the battery 40 to control charging time or may confirm an overheated state of the battery 40.

The heating ventilation air-conditioning controller 20 is connected to the refrigerant pressure sensor 122, an external air temperature sensor 124, a refrigerant temperature sensor 126, and an evaporator temperature sensor 128 to control the operation of the compressor 202 in consideration of the sensed values received from the respective sensors.

Also, the heating ventilation air-conditioning controller 20 may control the refrigerant adjustment valve 222 according to a signal received from the vehicle control module 100 to control the amount of the refrigerant supplied to the battery cooling unit 260.

Also, the vehicle may further include an input unit 130 to allow a user to input an operation desired by the user. The heating ventilation air-conditioning controller 120 may determine requirements of the user from a signal input through the input unit 130.

Hereinafter, the operation of the vehicle with the above-stated construction according to the second embodiment of the present invention will be described.

A high-temperature, high-pressure refrigerant compressed by the compressor 202 is introduced into the condenser 204 via the first refrigerant circulation passage 212.

The refrigerant introduced into the condenser 204 is condensed through heat exchange between the refrigerant and external air in the condenser 204, and then flows along the second refrigerant circulation passage 214.

At least some of the refrigerant flowing along the second refrigerant circulation passage 214 is bypassed to the refrigerant bypass passage 220, and the remainder of the refrigerant is supplied to the vehicle interior heat exchanger.

At this time, the battery temperature sensor 144 senses the temperature of the battery 40, and transmits the sensed temperature to the battery module system 142. The battery module system 142 transmits a signal according to the received temperature to the vehicle control module 100.

The heating ventilation air-conditioning controller 120 may control the refrigerant adjustment valve 222 based on the signal received from the vehicle control module 100 to determine whether to bypass the refrigerant to the refrigerant bypass passage 220 and to adjust the bypassed amount of the refrigerant.

That is, if the temperature of the sensor 40 sensed by the battery temperature sensor 144 is excessively high, the amount of the refrigerant bypassed to the refrigerant bypass passage 220 is increased to sufficiently cool the air in the battery heat exchanger 262.

On the other hand, if the temperature of the sensor 40 sensed by the battery temperature sensor 144 is relatively low, the amount of the refrigerant bypassed to the refrigerant bypass passage 220 may be increased, or bypassing of the refrigerant may be stopped.

In the battery heat exchanger 262 is performed heat exchange between the air introduced from the interior of the vehicle through the second duct 268 and the refrigerant introduced through the refrigerant bypass passage 220.

Heat of the air introduced into the battery heat exchanger 262 is transferred to the refrigerant with the result that the air is cooled. The cooled air is introduced into the battery 40 through the third duct 266.

The cool air introduced into the battery 40 may cool the battery 40 while passing between the cell modules 41.

The battery cooling system of the vehicle with the above-stated construction has an advantage in that the battery cooling system is little affected by the temperature of air in the interior of the vehicle even though the air in the interior of the vehicle is used.

Figure 10:
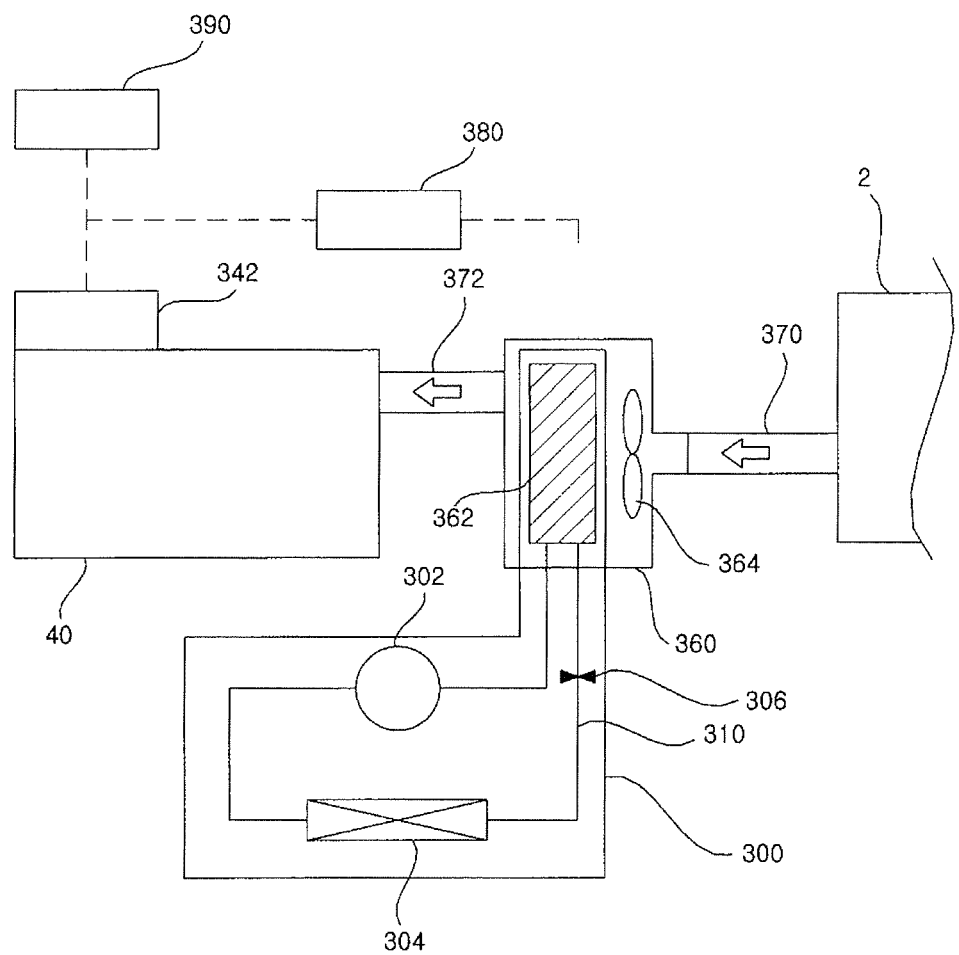
FIG. 10 is a view showing the construction of a battery cooling system of a vehicle according to a third embodiment of the present invention.
Figure 11:
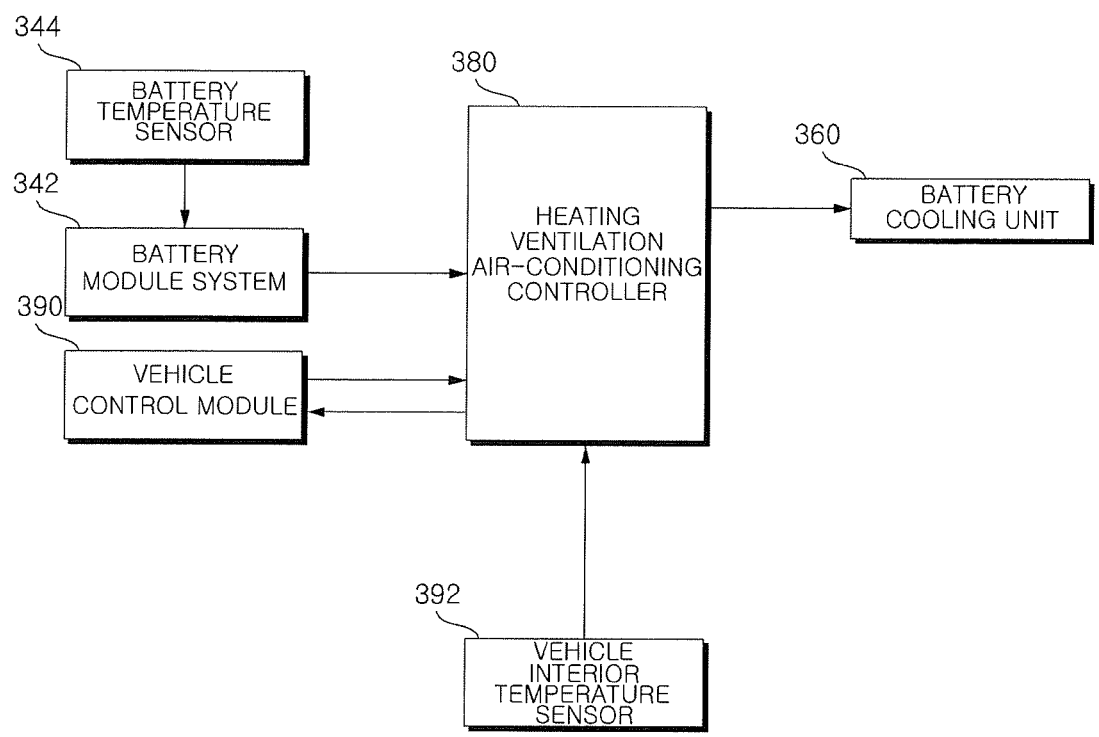
FIG. 11 is a block diagram showing the control flow of the battery cooling system of the vehicle according to the third embodiment of the present invention.

FIG. 10 is a view showing the construction of a battery cooling system of a vehicle according to a third embodiment of the present invention, and FIG. 11 is a block diagram showing the control flow of the battery cooling system of the vehicle according to the third embodiment of the present invention.

Referring to FIG. 10, the vehicle according to the third embodiment of the present invention includes an air conditioner 300 to condition air in an interior 2 of the vehicle using a refrigerant and a battery cooling unit 360 to perform heat exchange between the refrigerant circulated in the air conditioner 300 and air blown from the interior 2 of the vehicle and to cool a battery 40 using the air cooled by heat exchange. The battery 40 and other components of the vehicle according to the third embodiment of the present invention are similar in construction and operation to those of the vehicle according to the first embodiment of the present invention. Therefore, the same parts will be denoted by the same reference numerals, and a detailed description thereof will be omitted.

The air conditioner 300 may include a compressor 302 to compress a refrigerant, a condenser 304 to condense the refrigerant discharged from the compressor 302, an expansion valve 306 to expand the refrigerant discharged from the condenser 304, an evaporator 362 to evaporate the refrigerant discharged from the expansion valve 306, and a refrigerant circulation passage 310 interconnecting the compressor 302, the condenser 304, the expansion valve 306, and the evaporator 362 to circulate the refrigerant.

The battery cooling unit 360 includes a battery ventilation fan 364 to blow air in the interior 2 of the vehicle and a battery heat exchanger to perform heat exchange between the refrigerant circulated in the air conditioner 300 and the air blown from the interior 2 of the vehicle.

The evaporator 362 of the air conditioner 300 is used as the heat exchanger of the battery cooling unit 360; however, the present invention is not limited thereto. Of course, the heat exchanger may be installed separately from the evaporator of the air conditioner 300.

The battery cooling unit 360 is connected to the interior 2 of the vehicle via a first duct 370. Air in the interior 2 of the vehicle is supplied to the evaporator 362 through the first duct 370.

In the evaporator 362 is performed heat exchange between the air introduced through the first duct 370 and the refrigerant introduced through the refrigerant circulation passage 310. The refrigerant introduced through the refrigerant circulation passage 310 is evaporated by the heat exchange. As a result, heat of the air is transferred to the refrigerant with the result that the air is cooled.

Also, the battery cooling unit 360 is connected to the battery 40 via a second duct 372. Air in the interior 2 of the vehicle is supplied to the battery 40 through the second duct 372.

Also, the vehicle according to the present invention further includes a battery temperature sensor 344 to sense the temperature of the battery 40, a vehicle interior temperature sensor 392 to sense the temperature of the interior 2 of the vehicle, a heating ventilation air-conditioning (HVAC) controller 380 to control the operation of the air conditioner 300 based on the temperature of the battery and the temperature of the interior of the vehicle to control heat exchange in the battery cooling unit 360, a battery module system 342 to manage and control overall state of the battery 40, and a vehicle control module (VCM) 390 to control the heating ventilation air-conditioning controller 380 according to a signal from the battery module system 342.

The battery temperature sensor 344 is installed in the battery 40 to sense the temperature of the battery 40 in real time or at predetermined time intervals and to transmit the sensed temperature to the battery module system (BMS) 342.

The battery module system 342 manages and controls overall state of the battery 40. For example, the battery module system 342 may confirm a charged state of the battery to control charging time or may confirm an over-heated state of the battery 40.

The heating ventilation air-conditioning controller 380 is connected to a refrigerant pressure sensor (not shown), an external air temperature sensor (not shown), a refrigerant temperature sensor (not shown), and an evaporator temperature sensor (not shown) to control the operation of the compressor 302 in consideration of the sensed values received from the respective sensors.

The heating ventilation air-conditioning controller 380 transmits the sensed values received from the respective sensors to the battery module system 342 and receives a control signal from the vehicle control module 390.

The vehicle control module 390 is configured to control the overall operation of the vehicle. For example, the vehicle control module 390 may control the operation of a brake, a suspension, or a cooling fan (not shown). The vehicle control module 390 may receive a signal indicating the pressure of the refrigerant sensed by the refrigerant pressure sensor (not shown) and control rotational velocity of the cooling fan (not shown) according to the sensed pressure of the refrigerant.

The heating ventilation air-conditioning controller 380 is connected to the battery module system 342 and the vehicle control module 390.

Figure 12:
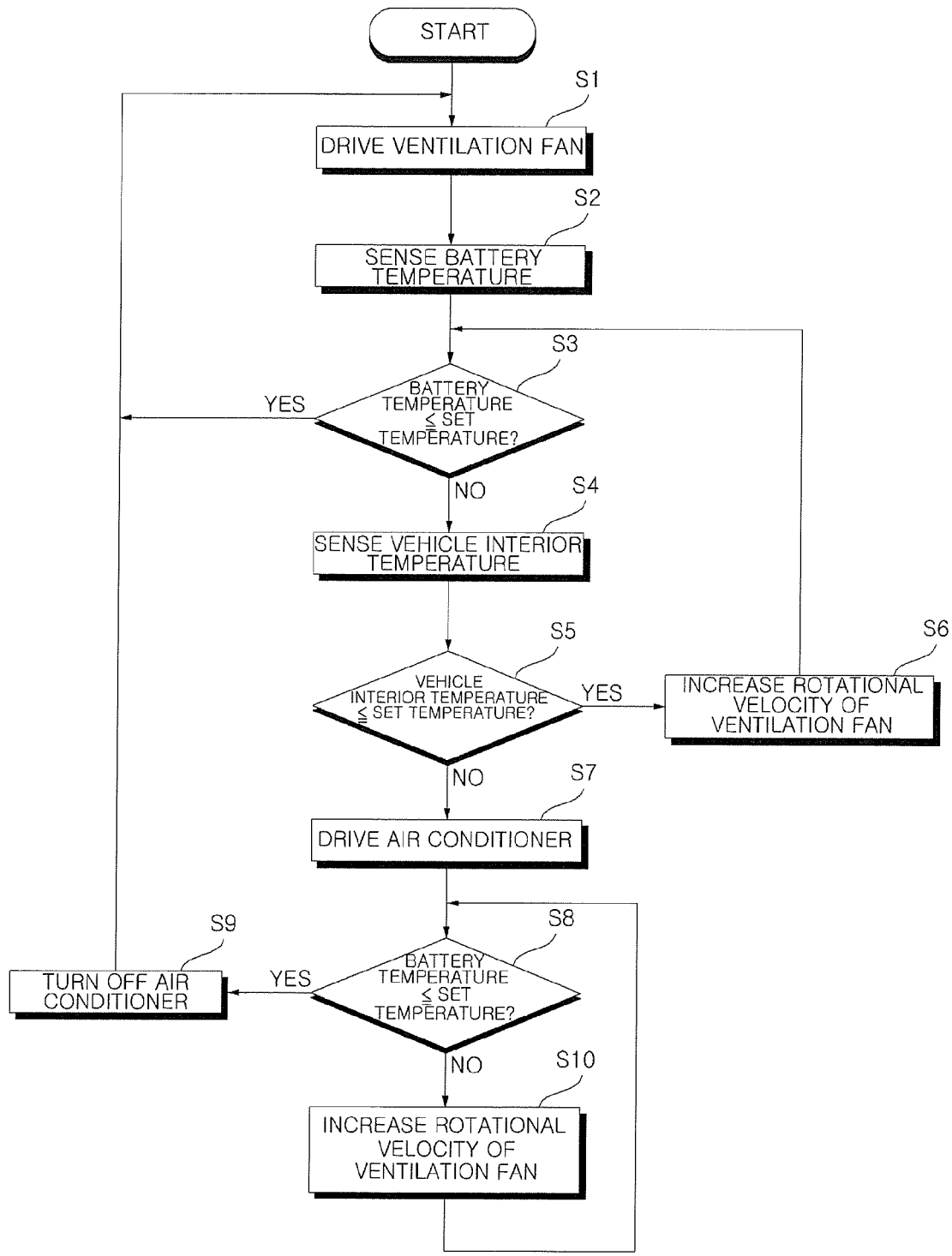
FIG. 12 is a flow chart showing a control method of the battery cooling system of the vehicle according to the third embodiment of the present invention.

FIG. 12 is a flow chart showing a control method of the battery cooling system of the vehicle according to the third embodiment of the present invention.

Hereinafter, the control method of the vehicle with the above-stated construction according to the third embodiment of the present invention will be described with reference to FIG. 12.

When the ventilation fan 364 is turned on, air in the interior 2 of the vehicle is supplied to the battery 40 through the first duct 370 by ventilation force generated by the ventilation fan 364 (S1). At this time, the ventilation fan 364 may be rotated at a low velocity.

The battery temperature sensor 344 senses the temperature of the battery 40 (S2). The battery temperature sensor 344 may sense the temperature of the battery 40 in real time or at predetermined time intervals. The temperature of the battery 40 at the above step is transmitted to the heating ventilation air-conditioning controller 380 via the battery module system 342 and the vehicle control module 390.

Also, the vehicle interior temperature sensor 392 senses the temperature of the interior 2 of the vehicle (S4). The vehicle interior temperature sensor 392 may sense the temperature of the interior 2 of the vehicle in real time or at predetermined time intervals. Consequently, the step of sensing the temperature of the interior 2 of the vehicle may be performed before the step of sensing the temperature of the battery 40. The temperature of the interior 2 of the vehicle sensed by the vehicle interior temperature sensor 392 is transmitted to the heating ventilation air-conditioning controller 380.

The heating ventilation air-conditioning controller 380 performs a battery temperature comparison step of comparing the sensed temperature of the battery with a set battery temperature (S3).

Upon determining at the battery temperature comparison step that the sensed temperature of the battery is lower than the set battery temperature, the heating ventilation air-conditioning controller 380 determines that the battery 40 is not overheated. As a result, the rotational state of the ventilation fan 364 is maintained.

On the other hand, upon determining at the battery temperature comparison step that the sensed temperature of the battery is higher than the set battery temperature, the heating ventilation air-conditioning controller 380 determines that the battery 40 may be overheated. In this case, the heating ventilation air-conditioning controller 380 determines whether the ventilation fan 364 will be accelerated to increase the ventilation amount of air or whether the air supplied from the ventilation fan 364 will be cooled by heat exchange using the air conditioner 300 and the cooled air will be supplied to the battery 40.

In order to determine whether the temperature of the air in the interior 2 of the vehicle is low enough to cool the battery 40, therefore, the heating ventilation air-conditioning controller 380 performs a vehicle interior temperature comparison step of comparing the temperature of the interior 2 of the vehicle with a set vehicle interior temperature (S5).

Here, the set battery temperature and the set vehicle interior temperature may be set to the same temperature or different temperatures. Hereinafter, the set battery temperature and the set vehicle interior temperature are the same and will be referred to as set temperatures.

Upon determining at the vehicle interior temperature comparison step that the sensed temperature of the interior of the vehicle is lower than the set temperature, the heating ventilation air-conditioning controller 380 determines that the air in the interior 2 of the vehicle is sufficient to cool the battery 40.

Consequently, the heating ventilation air-conditioning controller 380 increases the rotational velocity of the ventilation fan 364 to increase ventilation force generated by the ventilation fan 364 (S6).

Since the temperature of the air in the interior 2 of the vehicle is low enough to cool the battery 40, the ventilation force is increased to cool the battery 40.

On the other hand, upon determining that the sensed temperature of the interior of the vehicle is higher than the set temperature, the heating ventilation air-conditioning controller 380 determines that it is difficult for the air in the interior 2 of the vehicle to cool the battery 40.

Consequently, the heating ventilation air-conditioning controller 380 drives the air conditioner 300 (S7). At this time, the rotational velocity of the ventilation fan 364 is maintained at the initially driven state thereof.

As the air conditioner 300 is driven, the compressor 203 is driven to circulate a refrigerant.

In the evaporator 364, the circulated refrigerant exchanges heat with air introduced from the interior 2 of the vehicle. As a result, the air introduced from the interior 2 of the vehicle may be cooled by the refrigerant.

Consequently, the air cooled by heat exchange in the evaporator 364 is introduced into the battery 40 to cool the battery 40.

While the air heat-exchanged by the evaporator 364 is supplied to the battery 40, the temperature of the battery 40 is compared with the set temperature to determine whether the temperature of the battery 40 is lower that the set temperature (S8).

Upon determining that the temperature of the battery 40 is lower that the set temperature, the air conditioner 300 is turned off.

On the other hand, upon determining that the temperature of the battery 40 is higher that the set temperature, the rotational velocity of the ventilation fan 364 is increased to increase ventilation force (S10).

According to the present invention as described above, it is determined whether the air conditioner 300 will be used, or the rotational velocity of the ventilation fan 364 is adjusted, based on the temperature of the battery 40 and the temperature of the interior 2 of the vehicle, thereby more efficiently cooling the battery 40.

Figure 13:
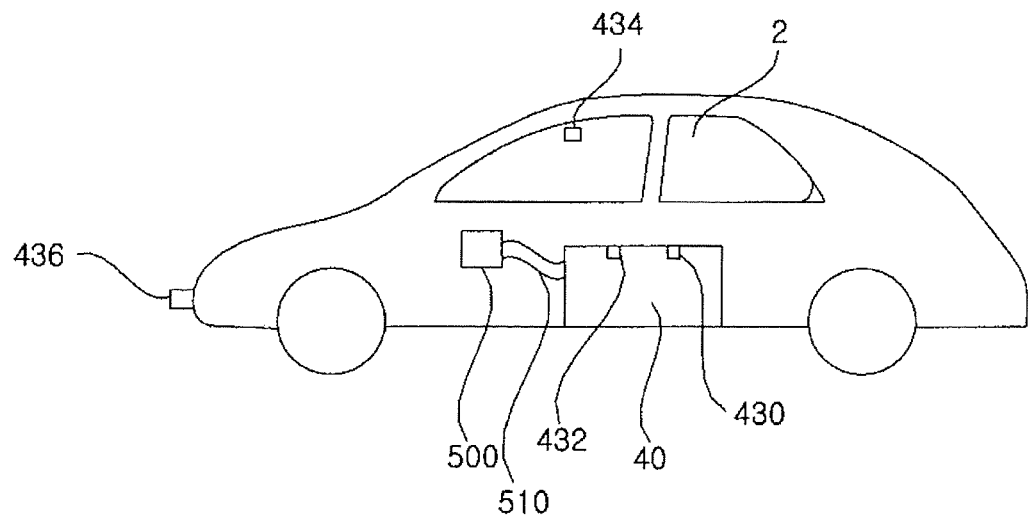
FIG. 13 is a schematic view showing a battery and a dehumidification unit according to a fourth embodiment of the present invention.
Figure 14:
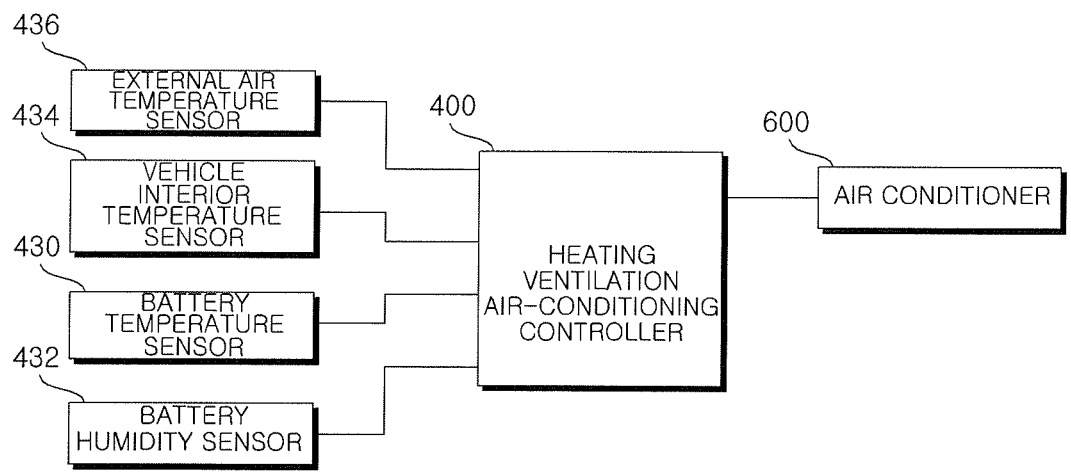
FIG. 14 is a block diagram showing the construction for dehumidifying the battery according to the fourth embodiment of the present invention.

FIG. 13 is a schematic view showing a battery and a dehumidification unit according to a fourth embodiment of the present invention, and FIG. 14 is a block diagram showing the construction for dehumidifying the battery according to the fourth embodiment of the present invention.

Referring to FIGS. 13 and 14, the vehicle according to the fourth embodiment of the present invention further includes a dehumidification unit to supply cool air into the battery 40 to dehumidify the interior of the battery 40 and a controller to control the operation of the dehumidification unit based on the humidity of the interior of the battery 40.

In the dehumidification unit, a heat exchanger to blow air in the interior 2 of the vehicle may be additionally installed to cool the interior of the battery 40, an air conditioner 600 to condition air in the interior 2 of the vehicle may be directly connected to the battery 40, or an additional dehumidifier to dehumidify only the battery 40 may be installed.

In this embodiment, the vehicle further includes an air conditioner 600 to condition air in the interior 2 of the vehicle, and the dehumidification unit includes a heat exchanger 500 to perform heat exchange between at least some of the refrigerant circulated in the air conditioner 600 and the air blown from the interior 2 of the vehicle to cool the air.

The heat exchanger 500 may be additionally installed. Alternatively, a heat exchanger 500, serving as an evaporator, included in the air conditioner 600 may be used. In this embodiment, the heat exchanger 500 of the air conditioner 600 is used.

A duct (not shown), through which air from the interior 2 of the vehicle is introduced, is connected to one side of the heat exchanger 500, and a duct 510, through which the air cooled in the heat exchanger 500 is guided to the battery 40, is connected to the other side of the heat exchanger 500.

Also, a refrigerant bypass hose (not shown) to bypass some of the refrigerant circulated in the air conditioner 600 may be connected to the heat exchanger 500.

The air conditioner 600 may include a compressor (not shown) to compress a refrigerant, a condenser (not shown) to condense the refrigerant discharged from the compressor (not shown), an expansion valve (not shown) to expand the refrigerant discharged from the condenser (not shown), an evaporator (not shown) to evaporate the refrigerant discharged from the expansion valve (not shown), and a refrigerant circulation hose (not shown) interconnecting the compressor (not shown), the condenser (not shown), the expansion valve (not shown), and the evaporator (not shown) to circulate the refrigerant.

The air conditioner 600 may be connected to the interior 2 of the vehicle to cool or heat the interior of the vehicle.

Also, the vehicle further includes a heating ventilation air-conditioning (HVAC) controller 400 to control the operation of the air conditioner 600, a battery module system (not shown) to manage and control the overall state of the battery 40, and a vehicle control module (VCM) (not shown) to control the heating ventilation air-conditioning controller 400 according to a signal from the battery module system (not shown).

The heating ventilation air-conditioning controller 400 may be used as the above-mentioned controller.

The heating ventilation air-conditioning controller 400 may be connected to an external air temperature sensor 436 to sense temperature of air outside the vehicle, a vehicle interior temperature sensor 434 to sense the temperature of the interior of the vehicle, a refrigerant temperature sensor (not shown), and an evaporator temperature sensor (not shown) to control the operation of the compressor (not shown) in consideration of the sensed values received from the respective sensors.

Also, the vehicle according to the present invention further includes a battery temperature sensor 430 installed in the battery 40 to sense the temperature in the battery 40 and a battery humidity sensor 432 installed in the battery 40 to sense the relative humidity in the battery 40.

The temperature of the battery sensed by the battery temperature sensor 430 and the humidity of the battery sensed by the battery humidity sensor 432 may be transmitted to the heating ventilation air-conditioning controller 400 via the battery module system (not shown).

The heating ventilation air-conditioning controller 400 may calculate a dew point temperature using the battery temperature Tb sensed by the battery temperature sensor 430 and the relative humidity Hb sensed by the battery humidity sensor 432. An equation to calculate the dew point temperature will be described below in detail.

Also, the heating ventilation air-conditioning controller 400 may calculate the temperature of the air introduced from the interior 2 of the vehicle into the battery using the vehicle interior temperature Ti sensed by the vehicle interior temperature sensor 434 and the external air temperature Ta sensed by the external air temperature sensor 436. The temperature of air introduced into the battery 40 based on the vehicle interior temperature Ti and the external air temperature Ta may be pre-stored as a table in the heating ventilation air-conditioning controller 400.

Since air outside the vehicle is introduced into the battery 40 via the interior 2 of the vehicle and the heat exchanger 500, the temperature of air in the battery 40 may be affected by the external air temperature Ta and the vehicle interior temperature Ti.

Consequently, the heating ventilation air-conditioning controller 400 controls the humidity in the battery 40 in consideration of the external air temperature Ta and the vehicle interior temperature Ti as well as the battery temperature Tb and the relative humidity Hb.

Figure 15:
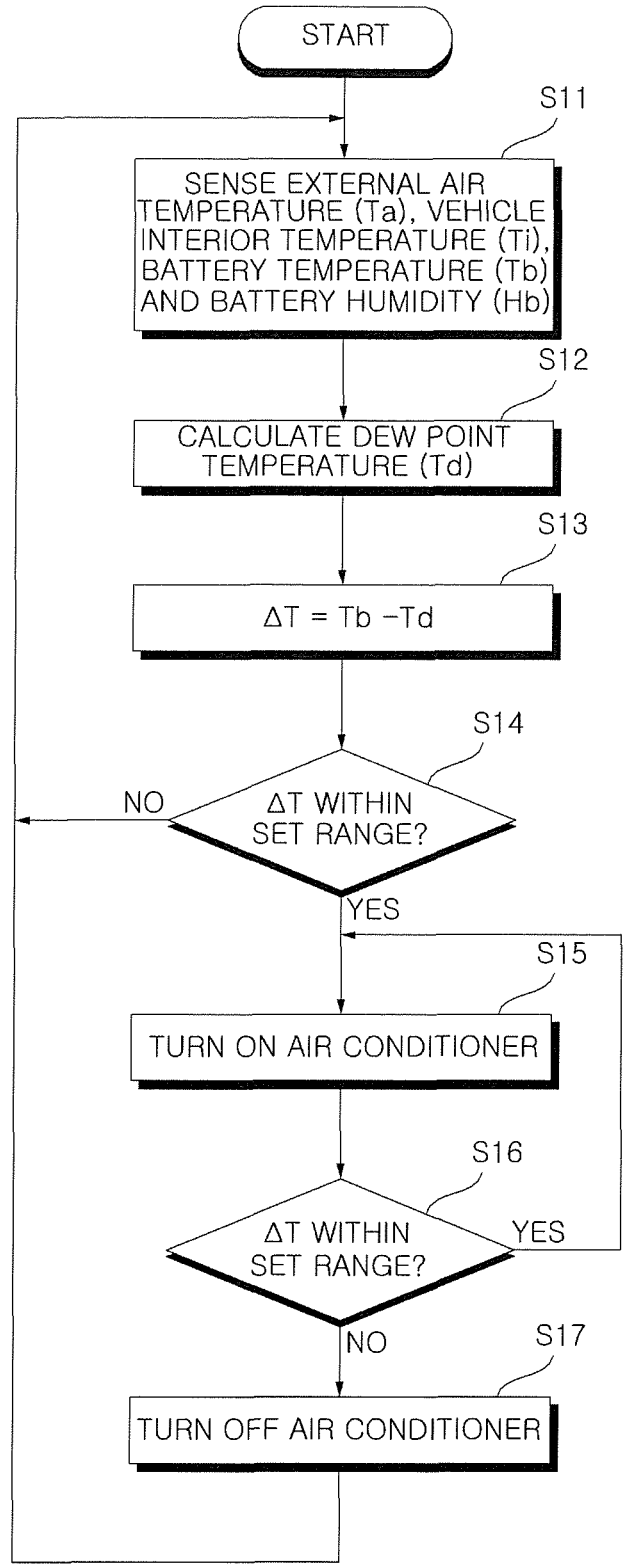
FIG. 15 is a flow chart showing a dehumidification method of the battery according to the fourth embodiment of the present invention.

FIG. 15 is a flow chart showing a dehumidification method of the battery according to the fourth embodiment of the present invention.

Hereinafter, a control method of the vehicle with the above-stated construction according to the fourth embodiment of the present invention will be described with reference to FIG. 15.

First, at a sensing step, the battery temperature sensor 430 senses temperature Tb in the battery 40 and the battery humidity sensor 432 senses relative humidity Hb in the battery 40 (S11).

Also, the vehicle interior temperature sensor 434 senses a vehicle interior temperature Ti, and the external air temperature sensor 436 senses an external air temperature Ta.

The respective sensors may be set to perform sensing in real time or at predetermined time intervals.

The battery temperature Tb sensed by the battery temperature sensor 430 and the battery humidity Hb sensed by the battery humidity sensor 432 are transmitted to the heating ventilation air-conditioning controller 400.

The heating ventilation air-conditioning controller 400 may calculate a dew point temperature Td using the battery temperature Tb and the battery humidity Hb (S12). The dew point temperature Td is a temperature at which vapor is saturated when atmospheric temperature is lowered in a state in which atmospheric pressure of atmosphere containing the vapor and the amount of the vapor are not changed.

The battery humidity Hb sensed at the sensing step is a relative humidity. The relative humidity is a ratio of the amount of the present vapor to the amount of vapor that can be maximally contained in the air at the present temperature (the amount of saturated vapor) expressed in terms of percent.

The amount of saturated vapor at the battery temperature Tb may be calculated based on the temperature Tb of the battery 40.

The amount of the present vapor may be calculated from an equation to calculate a relative humidity based on the amount of saturated vapor at the battery temperature Tb and the humidity Hb of the battery 40.

The dew point temperature Td, which is a temperature at which the present vapor is saturated, may be calculated based on the amount of the present vapor.

The amount of the present vapor or the dew point temperature Td may be easily calculated by ordinary people using a commercial psychrometric chart. Information regarding such a commercial psychrometric chart or a program to calculate the dew point temperature Td may be stored in the heating ventilation air-conditioning controller 400.

After the dew point temperature Td is calculated, a calculation step of calculating a difference LT between the present battery temperature Tb and the dew point temperature Td is performed (S13).

The heating ventilation air-conditioning controller 400 determines whether the difference ΔT between the present battery temperature Tb and the dew point temperature Td is within a set range (S14).

Upon determining that the difference ΔT between the present battery temperature Tb and the dew point temperature Td is within the set range, it may be determined that the interior of the battery 40 is humid and therefore, it is necessary to dehumidify the battery 40.

The set range may be set in consideration of the external air temperature Ta and the vehicle interior temperature Ti.

Since air outside the vehicle is introduced into the battery 40 via the interior 2 of the vehicle and the heat exchanger 500, the temperature of air in the battery 40 may be affected by the external air temperature Ta and the vehicle interior temperature Ti. Consequently, the heating ventilation air-conditioning controller 400 must control the humidity in the battery 40 in consideration of the external air temperature Ta and the vehicle interior temperature Ti as well as the battery temperature Tb and the battery humidity Hb.

That is, if the temperature of the air blown from the interior 2 of the vehicle into the battery 40 is sufficiently low, may be determined that it is not necessary to turn on the air conditioner 600 to perform dehumidification. Consequently, the set range is set based on the temperature of the air blown into the battery 40.

The heating ventilation air-conditioning controller 400 may predict the temperature of the air blown from the interior 2 of the vehicle into the battery 40 based on the external air temperature Ta and the vehicle interior temperature Ti. The temperature of the air blown from the interior 2 of the vehicle into the battery 40 based on the external air temperature Ta and the vehicle interior temperature Ti may be pre-stored as a table in the heating ventilation air-conditioning controller 400.

Consequently, the heating ventilation air-conditioning controller 400 calculates the temperature of the air blown from the interior 2 of the vehicle into the battery 40 in consideration of the external air temperature Ta and the vehicle interior temperature Ti and sets the set range based on the temperature of the air blown from the interior 2 of the vehicle into the battery 40. For example, if the temperature of the air blown into the battery 40 is low, the set range may be reduced.

When the set range is set, the heating ventilation air-conditioning controller 400 determines whether the difference ΔT between the present battery temperature Tb and the dew point temperature Td is within the set range (S14).

Upon determining that the difference ΔT between the present battery temperature Tb and the dew point temperature Td is within the set range, it may be determined that vapor is saturated, and therefore, a dew condensation phenomenon, in which dew is condensed, may occur. Consequently, a dehumidification step of turning on the air conditioner 600 to perform dehumidification is performed (S15).

When the air conditioner 600 is turned on, the refrigerant circulated in the air conditioner 600 is bypassed and introduced into the heat exchanger 500. In the heat exchanger 500, heat exchange between the bypassed refrigerant and air is performed. The air cooled by the heat exchange is supplied to the battery 40 through the duct 510 to dehumidify the interior of the battery 40.

After a predetermined time, it is determined whether the difference ΔT between the present battery temperature Tb and the dew point temperature Td is within the set range (S16).

Upon determining that the difference ΔT between the present battery temperature Tb and the dew point temperature Td deviates from the set range, it is determined that dehumidification has been sufficiently performed, and the air conditioner 600 is turned off.

Those skilled in the art to which the present invention pertains will appreciate that the present invention may be carried out in other specific ways than those set forth herein without departing from the technical ideas and essential characteristics of the present invention. The above embodiments are therefore to be construed in all aspects as illustrative and not restrictive. The scope of the invention should be determined by the appended claims, not by the above description, and all changes and modifications derived from the meaning and scope of the appended claims and their equivalents are intended to be embraced therein.

The invention claimed is:

1. A vehicle comprising:
   an air conditioner to condition air in an interior of the vehicle;
   a battery used as an energy source;
   a dehumidification unit to cool air blown from the interior of the vehicle;
   a duct, through which the air cooled by the dehumidification unit is guided to the battery;
   a battery temperature sensor to sense temperature in the battery;
   a battery humidity sensor to sense relative humidity in the battery;
   a vehicle interior temperature sensor to sense temperature of an interior of the vehicle;
   an external air temperature sensor to sense temperature of air outside the vehicle; and
   a controller configured to:
   calculate a dew point temperature using the battery temperature sensed by the battery temperature sensor and the battery humidity sensed by the battery humidity sensor,
   control the dehumidification unit such that a difference between the battery temperature and the dew point temperature is within a set range, wherein the set range is set based on the temperature of the interior of the vehicle sensed by the vehicle interior temperature sensor and the temperature of air outside the vehicle sensed by the external air temperature sensor.

2. The vehicle according to claim 1, wherein the dehumidification unit further comprises a battery heat exchanger to perform heat exchange between at least some of the refrigerant circulated in the air conditioner and the air blown from the interior of the vehicle.

* * * * *